United States Patent

[11] 3,620,525

| [72] | Inventor | George F. Hawley<br>Bogota, N.J. |
|---|---|---|
| [21] | Appl. No. | 873,748 |
| [22] | Filed | Nov. 24, 1969 |
| [45] | Patented | Nov. 16, 1971 |
| [73] | Assignee | Ivanhoe Research Corporation<br>New York, N.Y.<br>Continuation of application Ser. No.<br>601,768, Dec. 14, 1966, now abandoned.<br>This application Nov. 24, 1969, Ser. No.<br>873,748 |

[54] PRODUCTION SYSTEM FOR TREATING FABRIC WORKPIECES IN SEQUENCE AT A PLURALITY OF WORK STATIONS
12 Claims, 17 Drawing Figs.

[52] U.S. Cl. .................................................. 270/61 R, 112/131, 270/58, 270/93
[51] Int. Cl. .................................................. B65h 45/02
[50] Field of Search .................................................. 271/74; 112/2 A, 2 D, 2 V, 131; 223/37; 270/58, 93, 61

[56] References Cited
UNITED STATES PATENTS

| 1,426,892 | 8/1922 | McCoy | 112/262 |
| 3,170,423 | 2/1965 | Henebry | 112/2 |
| 3,232,256 | 2/1966 | Buckalter | 112/2 |
| 3,336,025 | 8/1967 | Shickman et al. | 271/60 X |
| 3,351,032 | 11/1967 | Junkins | 112/2 |

FOREIGN PATENTS
269,639  4/1927  Great Britain ...............

Primary Examiner—Robert W. Michell
Assistant Examiner—L. R. Oremland
Attorney—Bryan, Parmelee, Johnson & Bollinger ABSTRACT: A production system for automatically performing a sequence of work operations upon a plurality of fabric workpieces. Each successive workpiece is registered in an initial known position and then is transferred while controlling its position to a first work station to have a predetermined work operation performed at the first work station. The workpiece is successively transferred from the first work station to a second work station while being simultaneously rotated into a different angular orientation relative to the initial registered position and being controlled so as to position the workpiece in a predetermined relationship relative to the second work station, A further operation is performed on each workpiece at the second station and the treated workpieces are delivered in succession from the second work station. An incremental work performing system is described for fabric work pieces which performs increments of an operation; such as creasing at a sequence of work stations for completing the operation automatically while accommodating size changes in the workpiece without corresponding changes in the tooling size. The workpieces may be automatically registered at each workstation and they are moved and controlled in position during movement by a suction lifting clamp and by the differential in friction between the low friction supporting surface engaging the lower face of the workpiece and a high friction movable clamp engaging its upper face, the clamps being controlled in position and angular orientation.

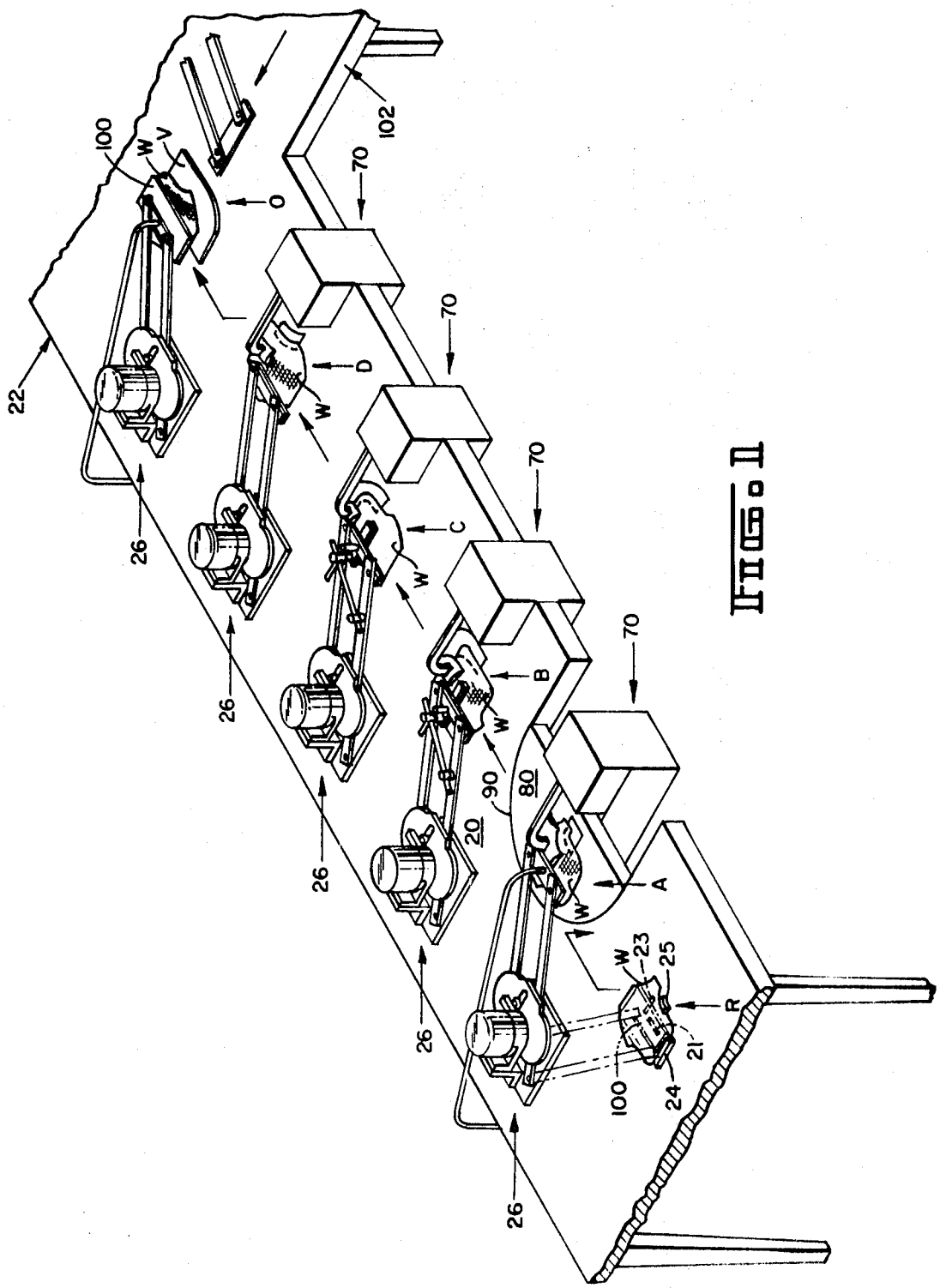

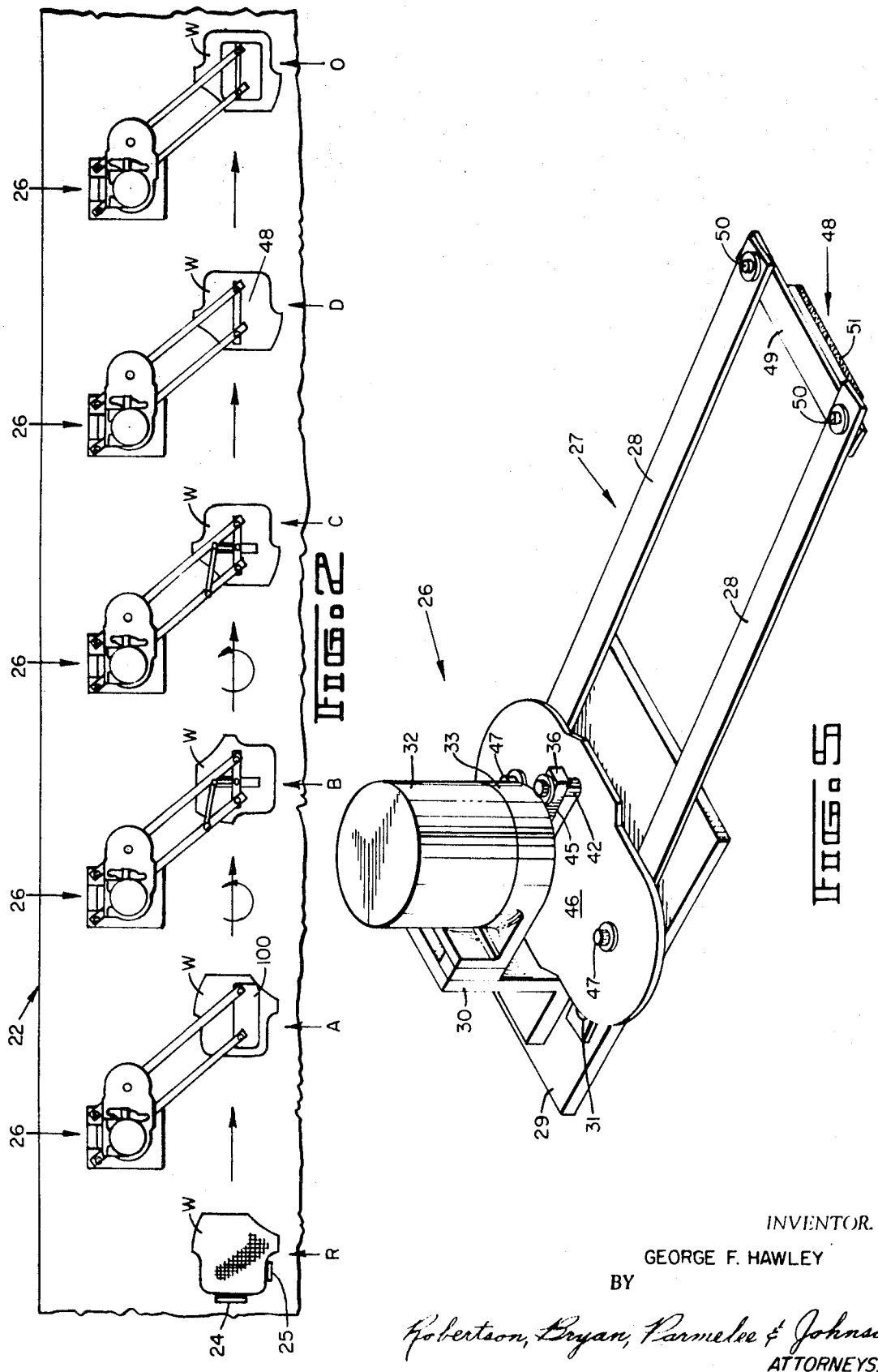

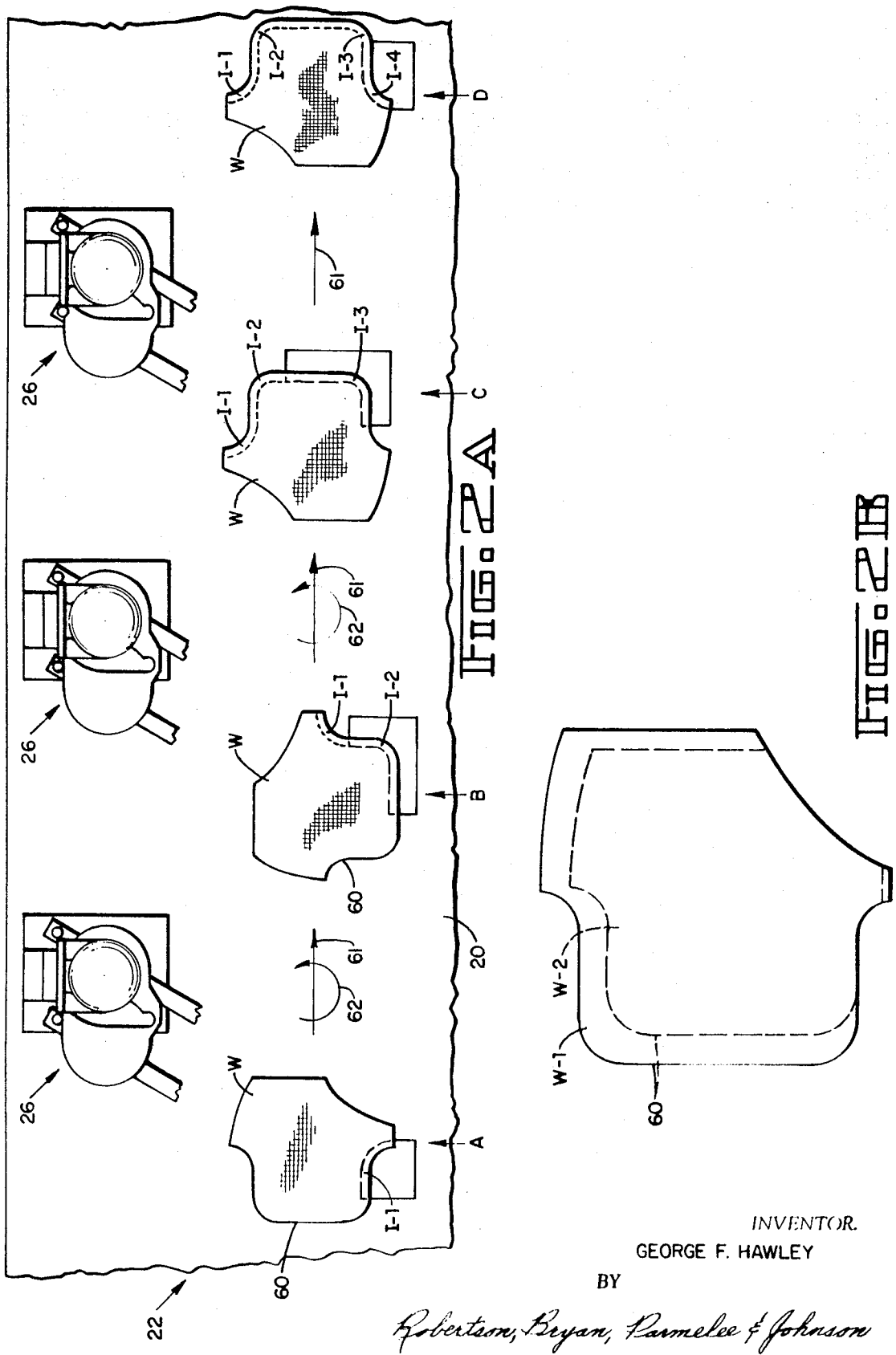

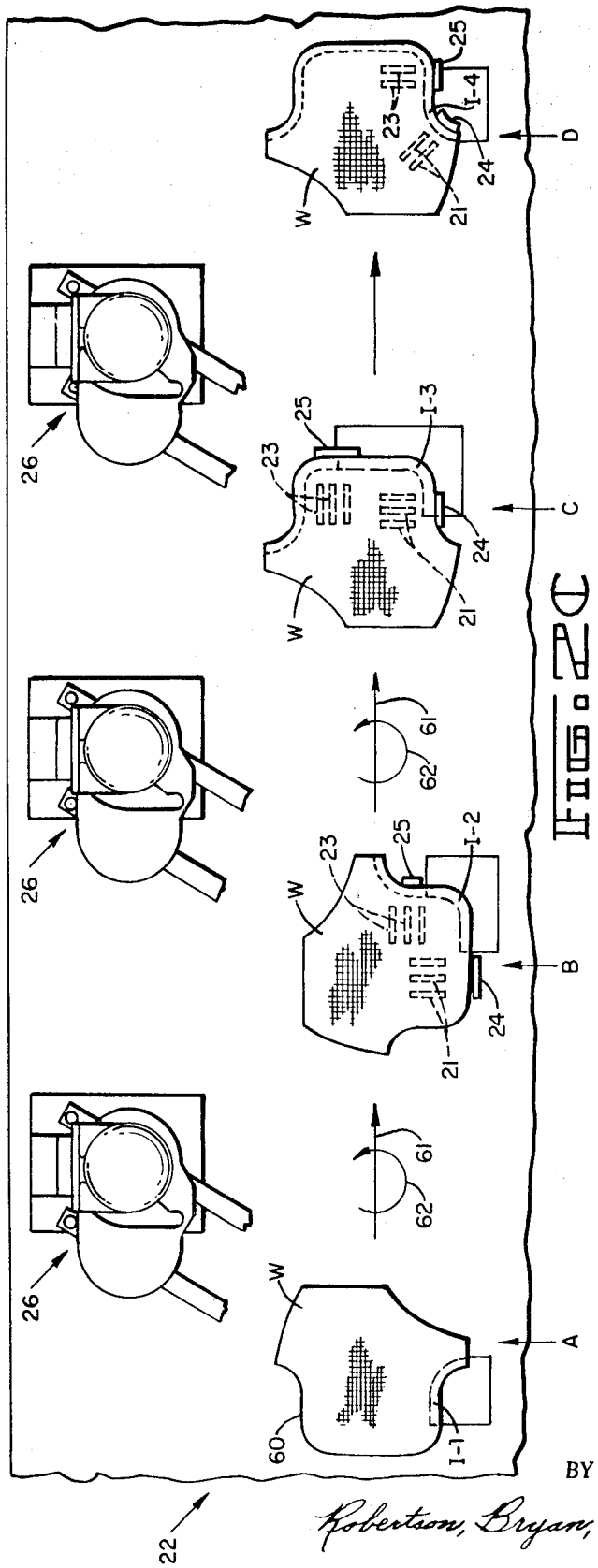

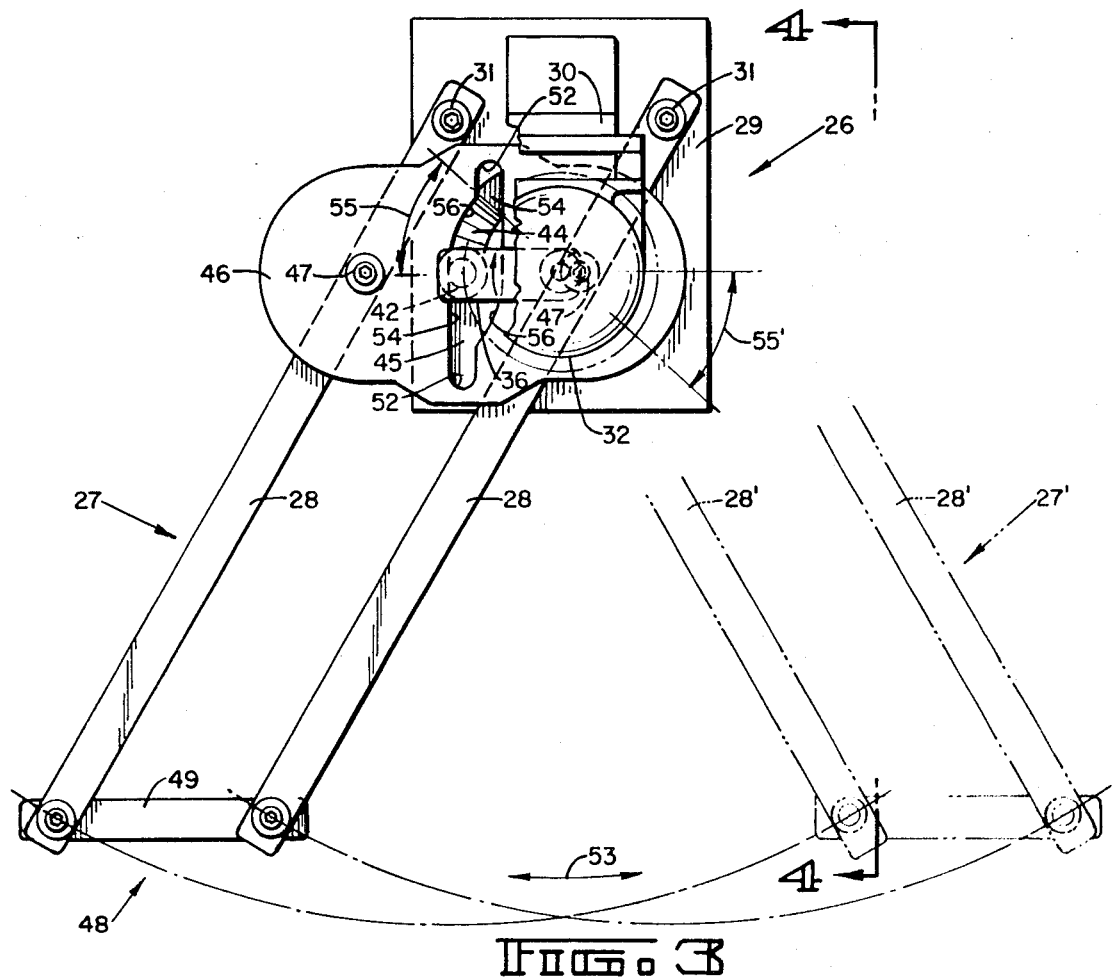
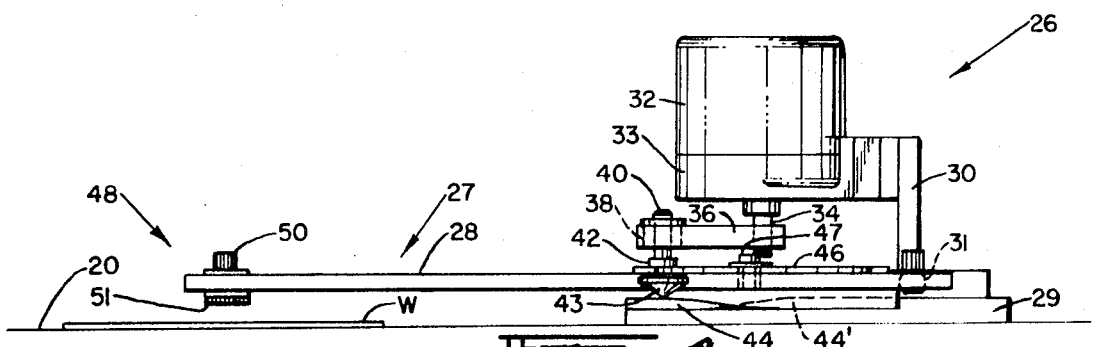
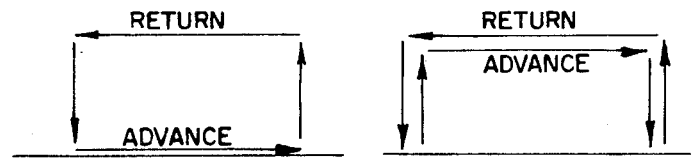
INVENTOR.
GEORGE F. HAWLEY
BY
Robertson, Bryan, Parmelee & Johnson
ATTORNEYS.

INVENTOR.
GEORGE F. HAWLEY
BY
*Robertson, Bryan, Parmelee & Johnson*
ATTORNEYS.

INVENTOR.
GEORGE F. HAWLEY
BY
Robertson, Bryan, Parmelee & Johnson
ATTORNEYS.

INVENTOR.
GEORGE F. HAWLEY
BY
Robertson, Bryan, Parmelee & Johnson
ATTORNEYS.

PRODUCTION SYSTEM FOR TREATING FABRIC WORKPIECES IN SEQUENCE AT A PLURALITY OF WORK STATIONS

This is a continuation of application, Ser. No. 601,768, filed Dec. 14, 1966, and now abandoned.

The present invention relates to a system for treating fabric workpieces in sequence at a plurality of work stations. More particularly the invention relates to a system for automatically performing a sequence of work operations upon predetermined portions of a plurality of workpieces at a sequence of work stations.

The present invention enables automobile or semiautomatic production systems to be set up quickly and easily for manufacturing various types and sizes of fabric goods such as clothing, headgear, footgear, home furnishings, and the like, including subassemblies of such goods. This invention enables such production systems to have flexibility in operation so as to accommodate various sizes, styles and types of fabric workpieces with a minimal amount of changes in tooling or dies in the system.

The invention can be embodied in production systems for performing various sequences of work operations upon a plurality of workpieces as will be explained further below, and the illustrative embodiments of the invention relate to fabric creasing and transferring for creasing an edge portion of a fabric workpiece so that the raw cut edge of the fabric is turned back against the body of the workpiece in preparation for suitable covering. One illustrative embodiment of this invention relates to creasing and transferring process for turning back and creasing different predetermined increments of the edge of the workpiece in various work stations and adapted for handling different sizes and shapes of workpieces. In one of its aspects this invention relates to transfer module apparatus having wide utility in the automatic processing of fabric workpieces for transferring workpieces from one work station to the next in a sequence of work stations.

In the system for automatically performing a sequence of work operations upon a plurality of fabric workpieces, in the broad aspect thereof, each successive workpiece is registered in a known position, a predetermined work operation is performed on each successive registered workpiece at a first work station, and each workpiece in succession is transferred from the first work station to a second work station and is turned into a different angular orientation, while being controlled so as to position the workpiece in a predetermined registered relationship relative to the second work station. A further operation is performed on each of the workpieces at the second station, and the treated workpieces are delivered in succession from the second work station.

In accordance with the fabric creasing embodiment of the system, the fabric workpieces are moved over a supporting surface having low friction upon which they can be slid, and predetermined increments of the edge of each workpiece are turned back against its main body and are creased so that after the process has been completed the edge remains turned back in preparation for lining or covering of the piece to form a finished part of a garment, apparel, or the like. In this process an increment of the edge is turned back and creased in the first work station, then the workpiece is transferred along the supporting surface to a subsequent work station and another increment of the edge is turned back and creased, and so forth, until the desired total portion of the edge is turned back and remains creased in readiness for further processing.

In accordance with one aspect of this invention transfer apparatus for moving the workpiece along a supporting surface from one work station to another is provided in the form of transfer modules which are conveniently adapted to be used singly or in sets for transferring the workpieces with various desired sequential movements.

Among the many advantages of the illustrative creasing system embodying the present invention are those resulting from the fact that a facility and convenience are provided for creasing the edges of various sizes and shapes of fabric workpieces and for handling a variety of shapes and sizes of such pieces.

As used herein the term "fabric" is intended to include woven goods and also nonwoven, felted, or perforate goods having a flexibility suitable for use in clothing, headgear, footgear, and similar use, regardless of whether the material of the goods is in one layer or multiple layers and regardless of whether the goods are formed of natural material, synthetic material or blended materials. As used herein the term "workpiece" is intended to include individual pieces as well as subassemblies or semifinished goods including two or more pieces or components secured together.

The term "transfer" or "transferring" is intended to mean the movement of a fabric workpiece from one region to a second region, while maintaining known positional relationships for the workpiece during this movement.

In this specification and in the accompanying drawings are described and shown a system for treating a plurality of fabric workpieces in sequence at a plurality or work stations illustratively embodying the present invention, and it is to be understood that these examples are not intended to be exhaustive nor limiting of the invention. These examples are given so as to disclose the invention fully and clearly to those skilled in the art so that the reader will appreciate how this invention can be adapted in various forms, each as may be best suited for the conditions of a particular type of fabric workpiece in a particular production system.

The various objects, aspects and advantages of the present invention will be more fully understood from a consideration of the following description in conjunction with the accompanying drawings, in which:

FIG. 1 is a perspective view illustrating the system for performing a sequence of work operations upon predetermined portions of a plurality of workpieces at a sequence of work stations.

FIG. 2 is a partial plan view of the system of FIG. 1, the workpiece being turned into different orientations at the various work stations;

FIG. 2A is an enlargement of a portion of FIG. 2 and showing steps in a system for creasing various predetermined increments of the edges of the workpieces in sequence;

FIG. 2B illustrates the flexibility of the system for creasing various sizes of similarly shaped workpieces;

FIG. 2C is a further embodiment of the invention wherein the workpieces are registered at each of a plurality of work stations providing great flexibility in accommodating size changes;

FIG. 3 is a plan view of one of the transfer modules of the system of FIGS. 1 and 2, and shown on enlarged scale with a part broken away to illustrate the structure;

FIG. 4 is a side elevational view of the transfer module of FIG. 3, as seen from the direction 4—4;

FIG. 5 is a perspective view of the module of FIGS. 3 and 4;

FIGS. 9A and 9B are motion diagrams for purposes of explaining two sequences of operation;

Figure 6:
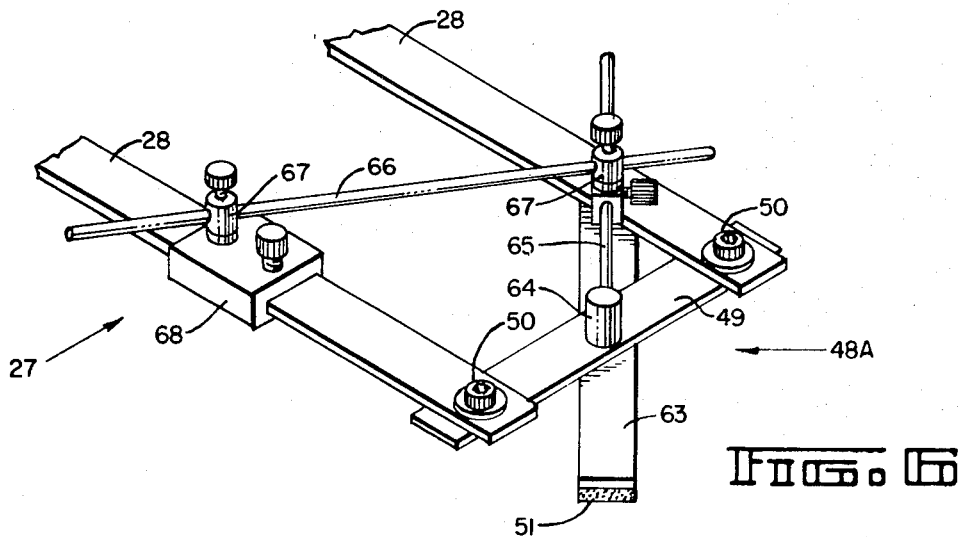
FIG. 6 is a partial perspective view illustrating a modified embodiment of the module of FIG. 5.

In the system shown in FIGS. 1, 2, 2A and 2C a sequence of work operations are performed upon predetermined portions of a plurality of fabric workpiece W at a sequence of work stations A, B, C and D. At each of the work stations the workpieces are oriented and registered so that the operation to be done is carried out on a different respective predetermined portion of the workpiece. In this manner a manufacturing sequence is accomplished by moving the workpiece through these stations.

In this illustrative example the work operations are shown as being a sequence of creasing steps, and it is to be understood by those skilled in the art that other fabric treating steps such as sewing, cementing or heat fusing can similarly be accomplished. The various fabric workpieces W are transferred to the successive stations A, B, C, and D by sliding them along a low-friction work supporting surface 20 provided by the smooth top surface of a long table 22. At each station A, B, C, and D a different predetermined increment of the edge of the workpiece is turned back and creased. Thus after the workpiece has been successively treated in each of the work stations, the desired total portion of the edge has become turned back and remains creased in readiness for further processing, and the creased workpieces are then combined with another workpiece V at an output station 0.

The workpieces W are each initially supplied to an input registration station R and are automatically brought into a known position at this input station by registration means 21 and 23 located beneath the table 22. The known position of the workpieces is obtained by applying force impulses to the workpiece alternately directed toward edge stops 24 and 25 so as to bring the respective edge portions of the workpiece up against the stops 24 and 25 located at the input station. This registration may be accomplished by automatically placing each workpiece on the supporting surface 20 in the vicinity of the stops 24 and 25. Then registration apparatus located beneath the table 22, for example such as shown in my joint copending application, Ser. No. 475,986, filed July 30, 1965, issued Dec. 1, 1970, as U.S. Pat. No. 3,544,098, serves to impel the edge of the workpiece against the stops 24 and 25.

In order to transfer the workpieces W along the supporting surface 20, there are a plurality of transfer modules 26 located intermediate each of the stations. These transfer modules are shown more clearly in FIGS. 3, 4, and 5, to which attention is invited. These transfer modules 26 are all identical except for certain modifications in their transfer arm means 27, as will be explained further below, for providing various transfer motions. The arm means 27 include a pair of parallel arm members 28 each pivoted by a universal bearing 31 to a base plate 29 adapted to be secured to the table 22. A bracket 30 (FIG. 4) extends up from the base 29 and holds drive means 32 in the form of an electric motor connnected to a speed-reducing gear unit 33 having a vertically extending drive shaft 34 with a crank arm 36 secured thereto so that this crank 36 revolves in a horizontal plane generally parallel with the workpiece supporting surface 20.

At the outer end of this crank 36 there is a sleeve bearing 38 (FIG. 4) in which is mounted a vertically slidable stud shaft 40, said stud shaft carrying both a cam driver element 42 and a cam follower button 43. This cam driver 42 is cylindrical and engages in a contoured slot 45 (FIG. 3) in a cam plate 46 which extends across between the pair of arm members 28 and is pivotally connected to each of these arm members by a pair of pivot bolts 47. Thus, the arm members 28 are swung back and forth by the revolving driver 42. The cam follower element 43 is a rounded conical button on the lower end of the driver which rides against an elevator cam 44, so that shoulder surface above the button 43 lifts or lowers the plate 46 to raise or lower the arm members 28.

The cam plate 44 is detachably secured to the base plate 29, and when it alone is used the cycle of motion produced is as shown in FIG. 9A wherein the arm means 27 is in its elevated position during the return stroke and is in its lowered position during the advancing transfer stroke, there being purely vertical travel during a dwell period at each end of the stroke.

Figure 7:
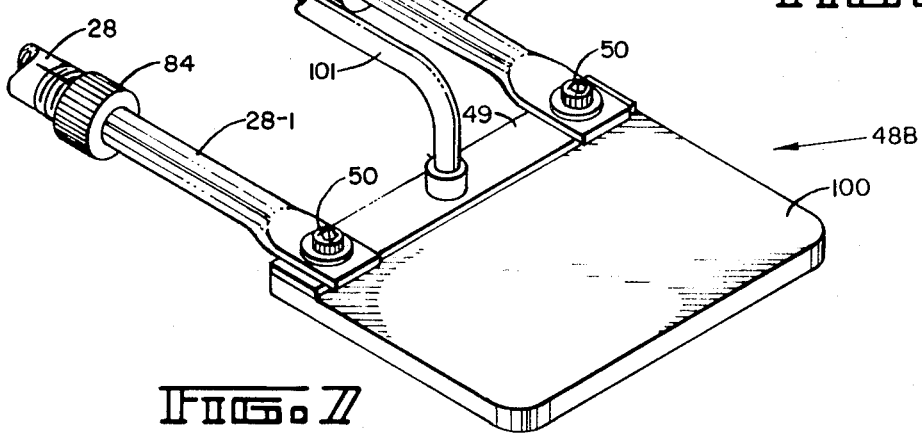
FIG. 7 is a view similar to FIG. 6 and illustrating a further modified embodiment.

By attaching another cam as indicated by dotted lines at 44' (FIG. 4), then the cycle of motion produced is as shown in FIG. 9B. It is to be understood that the return and advance strokes in FIG. 9B exactly retrace each other, the respective arrows being offset merely for clarity for illustration. This cycle of motion as shown in FIG. 9B is used when the fabric workpiece is being lifted during the advance stroke by a suction and friction gripper as shown in FIG. 7, as will be explained further below.

To engage and move the fabric workpiece W, friction gripping means 48 can be secured to the outer ends of the arm means 27, as shown in FIG. 4. The friction gripping means 48 include a link member 49 extending across between the arms 28 and detachably held by pivot bolts 50 with a resilient pad 51 beneath the member 49 adapted to provide a high coefficient of friction against the fabric, for example, this pad 51 is shown as sponge rubber.

Thus, the workpieces W (FIG. 4) are moved and controlled in position during movement by the differential in friction as between the low friction supporting surface 20 engaging the lower face of the workpieces W and the high friction gripping means 48 engaging the upper face of the workpieces. In this example the low friction surface 20 is a hard smooth polished table top for example of hardwood, metal, or the like, it being shown here as aluminum. It is noted that the two arm members 28, base 29, and link 49 comprise four-bar parallelogram linkage of which the base 29 is held stationary. Thus, as the arm members 28 are swung about their respective pivots 31, the link 49 always remains parallel with its initial position. In this manner the fabric workpiece W engaged by the friction gripping means 48 can be transferred from one station to the next while retaining its known relative orientation.

The vertical travel as shown in FIG. 9A and 9B at each of the stroke assures that the workpiece is not accidentally displaced laterally at the moment of engagement or disengagement of the workpiece by the transfer module.

For swinging the arm means 27 as indicated by the arrow 53 and for providing a substantial dwell time period at the end of each stroke, the contoured slot 45 (FIG. 3) has a pair of end recesses 52 with opposed sidewalls adapted to straddle the revolving driver 42, and arm means 27 are swung in the advance or return stroke when the driver 42 is in recess 52. This stroke continues as the driver 42 travels along the wall surface 54 forming a continuation of one side of the recess 52.

In the position of the driver 42 as shown in FIG. 3, the arm means 27 have reached the limit of their stroke, and the dwell period occurs as the driver 42 moves through the angle 55 while travelling along a curved length 56 of the wall, this curve 56 being concentric about the axis of drive shaft 34. During this dwell period 55, the cam follower button 43 rides down a slope of the cam 44 to lower the friction gripper means 48 perpendicularly onto a fabric workpiece W. It is noted that the shculder of the button 43 remains beneath the cam plate 46 in spite of the fact that the central portion of the slot 45 is enlarged.

In order to proved substantially vertical travel of the friction gripper pad 51, the pivots 31 are positioned close to the plane of the support surface 20, thereby assuring that the pad 51 is moving in a direction substantially perpendicular to the surface 20 at the instant when the pad 51 engages or disengages the workpiece.

In this illustrative embodiment the slot 45 is symmetrical and it includes a second curved surface 56 for providing a dwell period during elevation of the friction gripper means 48 at the limit 27'28' of the advance stroke, as the driver 42 moves through the angle 55'.

As discussed during the introduction, the contoured cut edge 60 of the workpiece is turned back against the body of the workpiece and is creased in preparation for subsequent operations, such as uniting with a suitable covering or lining, as the case may be. This creasing process is carried out in incremental steps as illustrated most clearly in FIG. 2A. Predetermined increments I-1, I-2, I-3 and I-4 of the contoured edge 60 of the workpiece W are creased at the respective work stations A, B, C and D. The edge 60 as shown here includes concave and convex curved segments with straight line segments extending between these curves and faired into the contiguous curves as by being tangent or asymptotic to the contiguous curves. The respective increments I-1, I-2, I-3 and I-4 are arranged so that they each begin and end at points along the edge 60 which lie on these straight line segments.

Among the advantages of this incremental creasing process are those resulting from the fact that the production lines as shown can readily be set up to crease a different size but similarly shaped workpiece. This flexibility in set up and ability to handle different sizes of similarly shaped workpieces is illustrated further in FIG. 2B and is advantageous in garment production lines, because the components of different sizes of the same type of garment have similar shapes. In this process the respective curved edge portions of different size workpieces are made the same, it is the straight line segments which have different length. FIG. 2B shows larger and smaller workpieces W-1 and W-2 wherein the respective curved segments of the edges 60 have the same curvature but the straight line segments of the respective edges 60 are of different length. The smaller workpiece W-2 is shown dotted merely for clarity of distinction.

By virtue of the fact that each creasing increment I-1, I-2, I-3, and I-4 begins and ends on a straight line segment of the curved edge 60, these creasing increments fill the respective curves and will crease the edges 60 of either workpiece W-1 or W-2.

As shown in FIG. 2A, when the workpiece is being transferred from station A to station B, and from B to C, it is rotated 90° in orientation, this combined translation and rotation being indicated by the composite arrows 61 and 62. A suitable modified transfer arm means 27A (FIG, 6) for providing the combined translation and rotation includes a bar 63 carrying the resilient friction pad 51 and being rotatably mounted on the member 49 by a central pivot 64 having a crank rod 65. A connecting rod 66 is attached at one end to the crank 65 by adjustable clamps 67 having a pivot between them, and the other end of the rod 66 is secured by pivot clamp 67 to an adjustable slide clamp 68 on one of the arms 28.

Figure 6A:
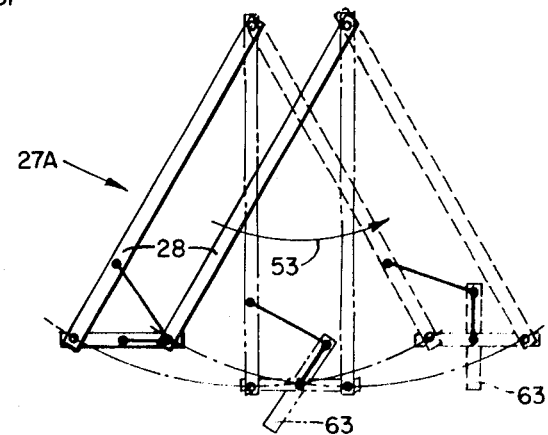
FIG. 6A illustrates successive operating positions of the apparatus of FIG. 6.

As shown in FIG. 6A, by properly positioning the respective clamps 67 and the slide clamp 68, the gripper bar 63 is caused to turn through a change in orientation of 90° in this case, as the swing arm means 27A move through their advance stroke 53. Other amounts of angular orientation either greater or less than 90° can readily be set by adjusting the friction gripping means 48A.

In order to provide further flexibility in handling fabric workpieces of various sizes, the registration thereof may be carried out at each of a plurality of work stations. Thus, the system automatically takes care of size change and adjustment of transfer stroke may be eliminated, by the system as shown in FIG. 2C. In stations B, C and D there are registration apparatus 21 and 23 located beneath the table 22 to apply force impulses to the fabric directed alternately toward the respective edge stops 24 and 25 so as to impell the edge of the workpiece against the stops. These steps are positioned to locate a predetermined portion of the workpiece in registration for an operation to be performed thereon at the respective station. Thus, the edge portions of the workpiece are properly registered at each of the stations B, C and D for the increments I-2, I-3 and I-4 to be creased in sequence.

The creasing operation at each station is carried out by an incremental creasing module 70 (FIG. 1) including an upper blade or anvil 71 (FIGS, 10, 11 and 12) on an arm 72 having actuating mechanism 73 for moving the anvil blade 71. Also, there is a lower crimp blade 74 on an arm 75 having actuating mechanism 76 for moving this blade 74. Normally the blade 74 rests within a clearance opening 78 in an adjustable table section 80.

During an incremental creasing operation the anvil blade 71 is initially pressed down firmly in the position 71' upon the workpiece with its creasing edge 79 aligned with the desired curved line of the crease I-1. Next, the lower blade 74 is raised up from the clearance opening 78 and crimps the edge of the workpiece W over and down onto the anvil blade 71. The anvil blade is withdrawn, and the crimp blade 74 presses down to complete the crease. To give a set to the crease, the blade 74 includes heating means 82. After the crease is set, the blade 74 returns to its initial position and the workpiece is then transferred to the next station.

In order to change the production line set up, the transfer modules 26, can readily be moved into different positions by adjusting the location of the base plate 29. The length of the transfer stroke can readily be changed by changing the length of the drive arm 36 or by extending or shortening the swing arm members 28. For example, FIG. 7 illustrates how these swing arms may readily be made of telescoping sections 28 and 28-1 with a screw clamp ferrule 84.

The creasing modules 70 fit into cut out portions of the table 22 with a circular joint line or seat 90 between the table 22 and the table section 80, the section 80 being included as a part of the creaser module 70. Thus, the creasing module 70 can readily be swung to different angular orientations with respect to the table 22 by turning the table section 80 along the joint line 90 and then securing the creaser module in its new location.

Figure 8:
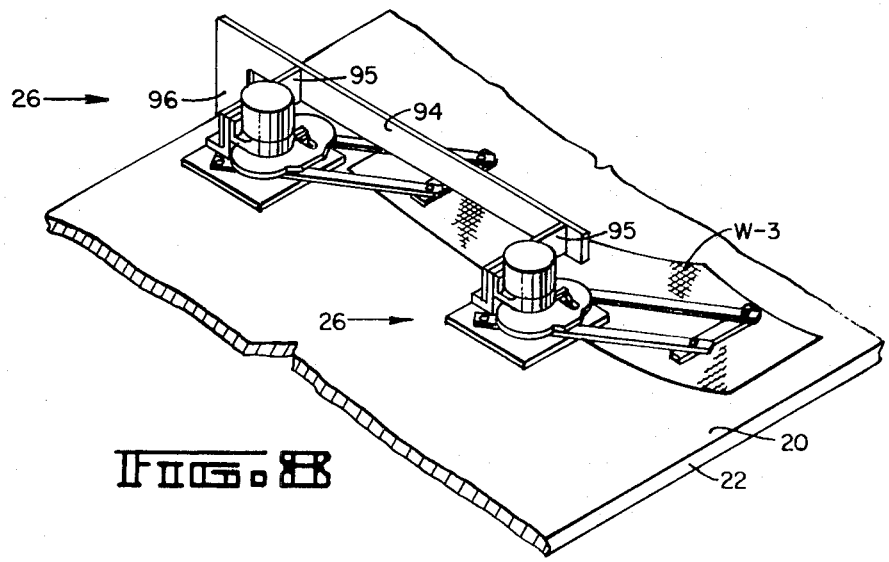
FIG. 8 shows a plurality of modules in simultaneous use for transferring a large fabric workpiece.
Figure 12:
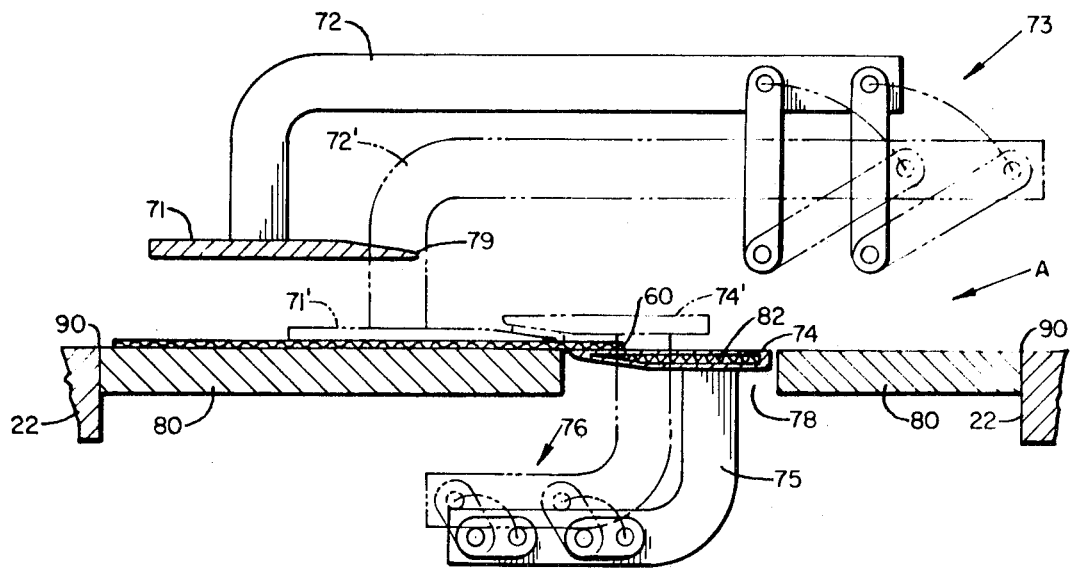
FIG. 12 is a cross-sectional view of the apparatus shown in FIGS. 10 and 11.
Figure 10:
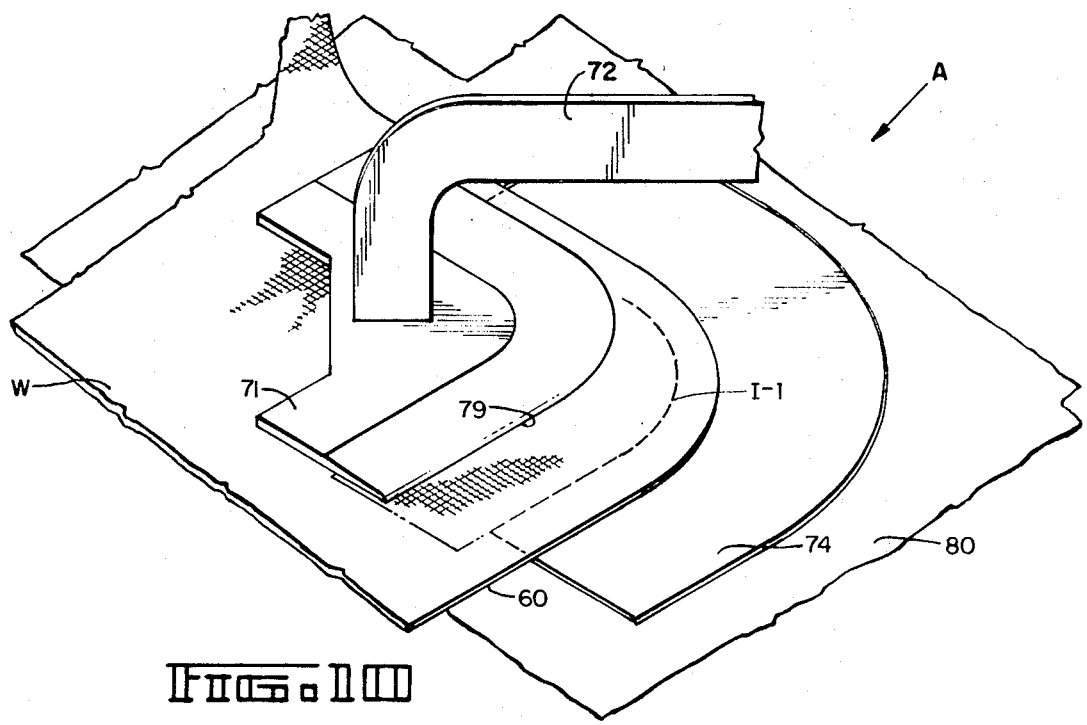
FIGS. 10 and 11 are perspective views illustrating two steps in the creasing of a curved portion of periphery of a workpiece.
Figure 11:
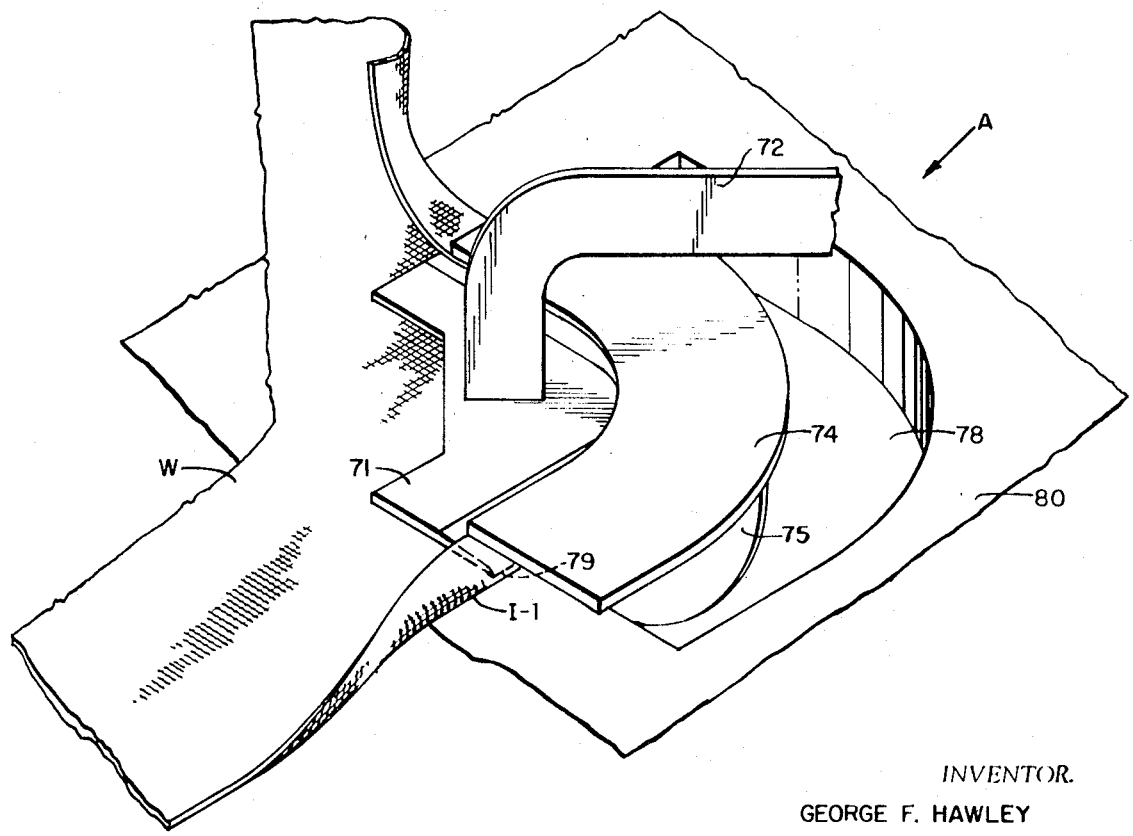

For handling relatively large workpieces W-3 (FIG. 8), for example such as a cloth leg panel of a pair of men's pants, a plurality of the transfer modules 26 may conveniently be ganged together by attaching them to an overhead mounting. The modules 26 are attached to the mounting 94 by brackets 95 secured to the respective brackets 30 of the modules, and an leg 96 of the mounting 94 is adjustably secured to the table 22.

In order to advance the workpiece for the registration station R (FIGS. 1 and 2) to the work station A, the lifting advance cycle (FIG. 9B) is used, and the friction gripping means 48B (FIG. 7) include a hollow shoe 100 attached to the member 49. A controlled suction line 101 communicates with the interior of this shoe 100. There are apertures in the bottom surface of the shoe 100 which engages the workpiece. The suction is applied during the pickup advance, and lowering of the shoe 100.

The lifting advance cycle (FIG. 9B) or the sliding advance cycle (FIG. 9A) may be used in connection with any of the stations whichever may be more convenient in transferring workpieces.

Also, a pickup cycle (FIG. 9B) and suction shoe 100 are used to transfer the workpiece from station D over onto the other workpiece V which has been transfered into the output station 0 from another table 102 as shown in FIG. 1, this table 102 converges with the main table 22 at the output station.

From the foregoing it will be understood that the illustrative embodiments of the production system of the present invention are well suited to provide the advantages set forth, and since many possible embodiments may be made of the various features of this invention and as the system herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as defined by the following claims.

What is claimed is:

1. A production system for automatically performing a sequence of operations on a plurality of fabric workpieces comprising a plurality of work stations, registering means for locating each successive workpiece in an initial known position, transferring means for placing each successive workpiece into a first work station including means for controlling the workpiece so as to maintain it in a predetermined registered relationship relative to said initial known position, work operation means for performing a predetermined operation on each successive registered workpiece at said first work station, transferring means for moving each workpiece in succession from said first work station including means for simultaneously rotating it into a different angular orientation with respect to its initial registered position and its position at said first work station, further including means for maintaining the workpiece in a predetermined registered relationship relative to said known position and said second work station, work operation means for performing a further operation on each successive registered workpiece at said second work station, and transfer means for delivering the treated workpieces in succession from said second work station.

2. A production system for automatically performing a sequence of operations on a plurality of fabric workpieces as claimed in claim 1 wherein the transferring means for moving each workpiece from said first work station to said second work station and the means for rotating the workpiece with respect to said known position are cooperatively associated so that the actions thereof are simultaneously incrementally combined so that each workpiece arrives at said second work station with the desired angular orientation relative to said known position.

3. A production system for creasing the edges of a plurality of fabric workpieces of different sizes to accommodate differences in sizes of the respective workpieces comprising a plurality of creasing stations, initial registering means for locating said workpieces in an initial known position, first transferring means for moving the workpieces in sequence to a first of said creasing stations, means for creasing a corresponding portion of their respective edges in said first creasing station, second transferring means for moving the workpieces in said sequence from said first creasing station into a second of said creasing stations including means for rotating the workpiece incrementally during transfer so that each workpiece arrives at said second creasing station with the desired angular orientation relative to said second work station, additional registering means for locating each workpiece in a known position at said second creasing station, means for creasing another portion of their respective edges in said second creasing station to complete the creasing of their edges, and third transferring means for moving the workpieces out of said second creasing station, whereby the desired edges of a sequence of workpieces may be automatically creased.

4. A production system for incrementally creasing the contoured edges of a plurality of fabric workpieces of different sizes to accommodate differences in sizes of the respective workpieces comprising a plurality of creasing stations, positioning means for locating the workpieces in sequence in a first of said creasing stations, first means for creasing a first increment of the edge portion of each workpiece against the body thereof in said first creasing station, initial transferring means for moving the workpieces in sequence from said first creasing station into a second of said creasing stations including means for simultaneously incrementally rotating the workpieces into a different angular orientation so as to be completely orientated upon arrival at said second creasing station, second means for creasing another increment of the edge portion of the workpiece respective edge back against the body thereof in said second creasing station to complete the creasing of their edges, and additional transferring means for moving the workpieces out of said second creasing station, whereby the desired edges of a sequence of workpieces may be automatically creased in spite of differences in sizes of the respective workpieces.

5. The system for creasing the contoured edge of a fabric workpiece as claimed in claim 4 wherein said initial transferring means includes a high friction grip means to engage the top of the workpiece to slide the workpiece upon a low friction surface while simultaneously imparting a rotational movement thereto.

6. A production system for automatically performing a sequence of operations on a plurality of fabric workpieces comprising first edge stop means in a known position, first force impulse applying means for registering the edge of each workpiece in succession against said first stop means first transferring means for moving said workpiece into a first work station, a first means for performing a work operation on a first predetermined portion of each successive registered workpiece at said work station, second transferring means for moving each workpiece in succession from said first work station to a second work station, second edge stop means in a known position at said second work station, a second force impulse applying means for registering a second predetermined edge portion of each workpiece with respect to said second stop means and a second means for performing a second work operation on each workpiece, third transferring means for moving each workpiece in succession from said second work station to a third work station, third edge stop means in a known position at said third work station a third force impulse applying means for registering a third predetermined edge portion of each workpiece with respect to said third stop means and a third means for performing a third work operation on each workpiece and transfer means for delivering the treated workpieces in succession from said third work station.

7. A production system for performing a sequence of operations on a fabric workpiece comprising registering means for locating the workpieces in a known position, first transferring means for moving the workpiece into a first work station including means for controlling the workpiece to maintain it in registry, first work performing means for performing an operation on the workpiece at said first work station, second transferring means for moving the workpiece from said first work station including means for simultaneously turning it into different angular orientation during transfer to arrive at said second work station properly oriented with respect to said known position, second work performing means for performing an operation on the workpiece at the second station, and third transferring means for moving the workpiece from said second station to a further station including means for simultaneously rotating said workpiece and turning it into a different angular orientation during transfer to arrive at said further station properly oriented with respect to said known position, said transferring and rotating means having a high friction grip which engages the top of the workpiece to move the workpiece relative to a low friction supporting surface by sliding said workpiece therealong.

8. A production system for continuously performing a sequence of operations on a plurality of fabric workpieces comprising a plurality of work station, registering means for locating each successive workpiece in an initially known position, transferring means for sliding each successive registered workpiece into a first work station including means gripping is so as to position it in a predetermined registered relationship relative to said work station, work performing means for performing a predetermined operation on each successive registered workpiece at said first work station, additional transferring means for sliding each workpiece in succession from said first work station to a second work station including means for simultaneously rotating it, said additional transferring means includes gripping means to provide the workpiece with a different angular orientation with respect to its initial registered position, additional work performing means for performing a further operation on each successive registered workpiece at said second work station and transfer means for delivering the treated workpieces in succession from said second work station.

9. A production system for continuously performing a sequence of operations on a plurality of fabric workpieces comprising a plurality of work stations, registering means for locating each successive workpiece in an initially known position, transferring means for lifting each successive registered workpiece into a first work station including means for gripping the workpiece so as to position it in a predetermined registered relationship relative to said work station, work performing means for performing a predetermined operation on each successive registered workpiece at said first work station, additional transferring means for lifting each workpiece in succession from said first work station to a second station including means for simultaneously rotating it to provide the workpiece with a different angular orientation with respect to its initial registered position, said additional transferring means including gripping means, additional work performing means for performing a further operation on each successive registered workpiece at said second work station and transfer means for delivering the treated workpieces in succession from said second work station.

10. A production system for continuously performing a sequence of operations on a plurality of fabric workpieces of various sizes comprising a plurality of work stations, registering means for locating each successive workpiece in an initial known position, each of said work stations including a remote gripper having an adjustable transfer stroke, a first of said grippers sliding each successive registered workpiece into a first work station to position it in a predetermined registered relationship relative to said first work station, work performing means for performing a predetermined operation on each successive registered workpiece at said first station, a second of said respective grippers for engaging each workpiece and sliding it in succession from said first work station to a second work station and means for rotating said gripper whereby said workpiece is turned incrementally into a different angular orientation with respect to its initial registered position to arrive at said second work station with a predetermined registered relationship relative to said second work station, additional work performing means for performing a further operation on each successive registered workpiece at said second work station, and transfer means for delivering the treated workpiece successively from said second work station, said remote grippers including means for readjusting the transfer stroke.

11. A production system for continuously performing a sequence of operations on a plurality of fabric workpieces of various sizes comprising a plurality of work stations, registering means for locating each successive workpiece in an initial known position, a remote gripper having an adjustable transfer stroke for each of said work stations, a first of said grippers for lifting each successive registered workpiece into a first work station to position it in a predetermined registered relationship relative to said first work station, work performing means for performing a predetermined operation on each successive registered workpiece at said first station, a second of said respective grippers for engaging and lifting each workpiece in succession from said first work station to a second work station and means for rotating said gripper whereby said workpiece is turned incrementally into a different angular orientation with respect to its initial registered position to arrive at said second work station with a predetermined registered relationship relative to said second work station, additional work performing means for performing a further operation on each successive registered workpiece at said second work station, and transfer means for delivering the treated workpiece successively from said second work station, said remote grippers including means for readjusting the transfer stroke.

12. A production system for automatically performing a sequence of operations on a succession of fabric workpieces comprising a plurality of work performing means located at a plurality of work performing stations, transfer means for moving the workpieces in succession along a predetermined path extending through each of said work stations, first edge stop means located at first fixed predetermined position in one of said work stations, first force impulse applying means for impelling the edge of each workpiece in succession against said first edge stop means for bringing each workpiece into a first predetermined registered position at said one work station in preparation for work to be performed thereon in said one work station, means for changing the orientation of each workpiece following said one work station, second edge stop means located at a second fixed predetermined position in a second work station following said one work station, said second predetermined position being at a different orientation from said first predetermined position, second force impulse applying means for impelling the edge of each workpiece in succession against said second edge stop means for bringing each workpiece into a second predetermined registered position at said second work station in preparation for work to be performed thereon in said second work station, whereby a sequence of operations are performed automatically on a succession of workpieces.

* * * * *